United States Patent Office 3,215,534
Patented Nov. 2, 1965

3,215,534
PROCESS FOR ENHANCING THE PALATABILITY OF MEATS
Morton S. Baum, 1504 N. 40th Ave., Hollywood Hills, Fla., and Frank R. Moreo, 6432 SW. 22 Court, West Hollywood, Fla.
No Drawing. Filed July 5, 1961, Ser. No. 121,839
7 Claims. (Cl. 99—107)

This invention relates to a composition and process for enhancing the palatability of meats and more particularly to a composition and process for treating lower grade meats in order to give them the appearance and taste of choice and prime grades of meat.

In determining the palatability and grade of meat, one must consider various aspects of the meat product. These considerations can be grouped as follows: fat content, moisture content, shape, tenderness and flavor. The known processes for artificially treating cuts of meat which are below the standard of the usually accepted prime cuts have generally been directed to the improvement of only one of these particular conditions in a single operation. Additionaly, the known particular types of treatment used to attain any one of the above conditions vary as to the processes used.

The processes previously in use for providing added fat to lean meat generally fall into two categories; namely, larding and marbling. Larding is a relatively old process wherein a substantial amount of fat is placed at various intervals within the meat in order to improve the cooking qualities of the meat and add flavoring during the cooking process. The larding technique has only proved to be successful to a certain degree in that the resulting effect of this insertion is limited to the general area of the meat in which the fat is placed and does not permeate the entire cut of meat. Accordingly, the undesirable features of having intermediate portions of tough unflavored meat is a definite drawback.

Marbling, which is the injection of fat throughout the meat to not only disperse the fat properly but also to create the effect of prime beef, has proven to be more satisfactory. The presently known process for artificial marbling is by means of injecting a liquefied fat into the main arterial trunk of a freshly slaughtered animal whereby the fat will follow the arteries and capillaries thus giving a marbleized texture to the meat. The main disadvantage of this technique is that it requires very particular and careful slaughtering of the animal and an injection of the fat at a specified time, such as before rigor mortis. Accordingly, this technique adds greatly to the expense of the preparation of the animal and must be reflected in the final price of the meat to the consumer.

Most of the recent attention given to artificial treatment of meat has been in the tenderizing field. The natural means of tenderizing meat is through the aging process wherein bacterial action breaks down the fibers of the meat over a period of time. The two major processes of artificially tenderizing meat are the dip method and the use of a powder on the meat itself. In both of these processes the active ingredient used for tenderizing is a proteolytic enzyme which acts on the meat fibers.

When a powder is to be used for tenderizing the meat, it is generally intended for use by the consumer and is applied just prior to cooking the meat. The powder is sprinkled or brushed on the meat and allowed to stand for several hours in order to allow the ingredients to react with the meat. In the dip process, the entire piece of meat is dipped in a solution containing the enzymes and this also must be drained and allowed to sit for several hours to obtain a tenderizing action before cooking. Both the powder and dip processes have drawbacks in that the tenderizer is placed on the outer portion of the meat and must work inwardly therefrom. Experiments have shown that even with a lengthy waiting period, the tenderizer does not reach the interior of the meat to a degree comparable to the tenderizing of the outer part of the meat and, accordingly, an uneven tenderizing process results. Additionally, the enzyme attacks the outer part of the meat and, after several hours, a slimy coating appears on the surface of the meat which is highly undesirable.

Another experimental process of tenderizing meat has been through the use of arterial pumping of tenderizer in live animals, which, to our knowledge, has not as yet met with any commercial success.

Flavoring of meat also is well known and is normally done through the use of a powder or a liquid which again has the drawbacks of flavoring the outer portion of the meat without obtaining a uniform flavor throughout the meat itself. Another method which has been proposed is the jab or stitch pumping of a flavoring enzyme which is placed in the animal before rigor mortis sets in.

There is no composition or process, to our knowledge, wherein the above discussed attributes of flavoring, marbling, conforming, moisturizing and tenderizing may be obtained through treatment of meat in but one single process. For each of the above discussed treatments, a separate process is involved and, accordingly, these separate individual procedures involve considerable time and expense, thus adding to the ultimate cost of the meat.

Accordingly, it is an object of this invention to provide a composition and process for treating meat which will provide marbleization, tenderization, conformation, flavorization and moisturization of inferior grade meat when injected therein.

A further object of this invention is to provide a composition having the above desirable results which may be injected into the meat by the "jab" or "stitch" pumping method.

A still further object of this invention is to provide a composition having the above desirable attributes which may be stored in a solid form and liquefied for injection into the meat.

Another object of this invention is to provide a composition of the above nature which will remain in a blended state until injected into the meat.

Yet another object of this invention is to provide a composition of the above nature wherein the marbling, conforming, flavoring, and moisturizing occurs upon injection of the compound into the meat and the tenderizing ingredient remains dormant until application of cooking heat.

Still another object of the invention is to provide a composition of the above nature which accomplishes the above desirable results directly within the meat itself.

A still further object of the invention is to provide meat of a lower grade with the marbleization, conformation, flavor, moisturization and tenderness associated with choice and prime grade meats.

A further object of this invention is to provide a process for artificially marbling meats in a chilled form.

Another object of this invention is to provide a process for enhancing the palatability of meats by stitch pumping of the meat with a liquid composition.

An additional object of our invention is to provide a process for producing a dietetic, high quality meat, high in protein and low in cholesterol.

Another object of this invention is to provide a composition and process for treating meats having the above desirable attributes which is economical to produce and which meets all Government regulations and requirements.

The composition

The basic requirement of the composition of the present invention is that all of the elements therein be thoroughly blended in a manner such that they will remain in this blended state when chilled, frozen or in a liquid state until actual stitch pumping of the meat.

The composition consists of the following ingredients:

(1) Clean strained rendered fat, which may be any of the known fats such as beef, lamb, pork, veal or vegetable fats. The choice of fats is the controlling factor in the flavor which is added to the meats and, accordingly, normal usage would dictate that one of the animal fats be chosen for the particular meat which is to be treated. However, a vegetable fat could be used and an artificial flavoring added to the compound in order to obtain the desired flavor.

(2) A proteolytic enzyme tenderizer in a liquid solution which is blended with the above fat. In the broad aspects of the invention, any proteolytic enzyme tenderizer may be used but the particular qualities and reactions desired dictate a preference in the use of a particular type of tenderizer. This is a type of tenderizer that remains dormant and does not act on the fibers of the meat until the meat reaches a cooking temperature of approximately 120° F. and above, and which returns to a dormant stage either upon the removal of cooking temperatures or after a definite time wherein the tenderizing action is completed. In either case there will not be such a complete tenderizing action that the meat will shred and fall apart. One such tenderizer meeting the above requirements is a mixture of sodium chloride, sugar, a vegetable enzyme such as bromelin, and a flavoring and seasoning mixture consisting of monosodium glutamate, yeast, caramel and a hydrolyzed vegetable protein. A preferred mixture of this tenderizer contains sodium chloride 46%, sugar 37%, bromelin 1%, and flavoring and seasoning 16%.

(3) The third ingredient is water, which of course should be purified in order to avoid the addition of any foreign flavoring or mineral content. This water acts as a carrier for the proteolytic enzyme in solution therewith and when combined with the fat and maintained at a chilled state provides a blended composition having the consistency of margarine.

Additionally, since all fats are required to be treated with a preservative, it is contemplated that the preservative be added to the above solution. Although the preservative is not necessary to accomplish the desired results of the invention, it is advantageous to add the preservative to the composition to eliminate a separate step in treating the meat. It has been found that the preservative does not in any way change the results obtained when treating the meat with the composition of the present invention. Further, another advantage is obtained if a preservative is used which prevents deterioration of the fat at room temperatures. One such preservative is known commercially as Lardox. If the proteolytic enzyme solution is used which does not react on the meat to tenderize the same until cooking temperatures are reached and a preservative is also used combined or blended with the composition which will prevent the fat from spoiling at room temperatures, it is then possible to retain the qualities of the composition of the invention at normal room temperatures.

Preparation of the composition

As stated above, the basic requirement of the invention is that the composition be prepared in such a manner that it will remain in a blended state whether frozen, chilled or in liquid form until injection thereof into the meat. The following preferred process for preparing the composition meets the above stated requirements.

The fat to be used is finely ground and placed in a stainless steel or aluminum kettle and brought to a boil. While the fat is at a high temperature, it is strained into a clean container and allowed to remain in the container until it has cooled to approximately 110° F.

A preservative such as that mentioned above is then added to the liquid fat in the proportion required to meet Government standards.

One ounce of the proteolytic enzyme mixture mentioned above is mixed with 2½ pounds of cold water that has been purified. This mixing is continued until the enzyme mixture is completely dissolved in the water and the resultant solution is allowed to stand for approxmately 5 minutes.

Then, 2½ pounds of the strained, clean, rendered fat at approximately 110° F. is placed in the blender. The blender is then run at a relatively low speed for approximately one minute and the speed is then increased to the high blending speed, at which time the enzyme and water solution, approximately 2½ pounds, is poured rapidly into the blender. The high speed blending operation is continued for approximately 30 seconds which produces a composition which is completely blended as to all ingredients and which has the consistency of damp margarine.

This composition may be retained with out separation or deterioration by either placing it in a refrigerated cooler between 38° F. and 42° F. or it may be frozen for shipping purposes.

It should be noted that even though the composition when frozen has a tendency to separate slightly under any excess pressure or strong blows, this is of no consequence since it is still a blended composition and will remain so when liquefied.

When the composition is to be used for injection into the meat, if it is not in liquid form, it is reheated gradually to approximately 110° F. while undergoing constant agitation. This agitation and heating results in a liquefied blend which does not congeal.

Preparation of the meat

The preferred method of introducing the liquid solution into the meat is by the injection method. The liquefied composition, as described above, is introduced into the meat through a hollow needle at rather closely spaced intervals. This type of injection is known in the meat treating art as "jab" or "stitch" pumping and will be referred to hereinafter in this manner.

The pressure at which the liquefied composition is introduced into the meat will vary according to the size of the needle used and will normally be approximately 40 to 60 pounds.

The amount of the composition placed in the meat will be controlled according to limits set forth by the governing laws which vary to a certain degree in every State. Normally, the allowable limits approximate one portion of the composition to five equivalent portions of meat.

Since the meat is cold due to chilling, the injection of the liquefied composition at an elevated temperature results in the congealing of the fat or suet at the point where it is injected into the meat and the water acts as a carrier for the proteolytic enzyme. The pressure of injection causes a dispersion of this liquid throughout the body of the portion of the meat being treated.

The composition of the present invention is designed to be used in the treatment of utility or cutter canner beef primarily, but may also be used in the treatment of any meat to obtain the desired results.

The advantages of the above treatment with the composition of the present invention will now become obvious to those familiar with the meat treating art. We have achieved, through stitch pumping, a uniform conformation of the meat which heretofore has not been accomplished in utility type of meat. This result is produced by injecting the composition under pressure with the resultant dispersion of the fluid as discussed hereinabove. We have also moisturized the meat as a result of this dispersion process wherein the purified water disperses throughout the meat and gives an even moisture content thereof. Due to the even dispersement of the water which acts as a carrier for the proteolytic enzyme we have created a tenderizing process for the meat which works from the inside of the meat outwardly and does not give the meat any of the deleterious slippery, slimy effects inherent in many of the dip tenderizers or powder tenderizers which work from the outside of the meat inwardly.

By stitch pumping of the purified fat which congeals within the cold meat, we have created a texture in the meat that heretofore was not possible in lower grade meats. This same process results in the marbling of the meat, thus giving the appearance generally associated with choice or prime meats, and which is desirable because it not only evenly disperses the fat for cooking purposes but also enhances the flavor of the meat due to the flavor existing in the fat itself. This marbling also brings out dark colored meat to a much pinker color, thus enhancing the overall appearance of the meat formerly available only in choice or prime cuts of meat.

It should also be noted that, in some respects, a piece of canner cutter beef treated with this composition is superior even to prime aged beef. Prime beef is aged in order to break down the tissues to obtain the desired tenderness. In this aging process a certain amount of moisture is lost and this dehydration process results in a loss of a great amount of the original flavor of the meat. Through the use of the present invention we create a prime type aged, flavored beef without allowing any bacteria action because we avoid the old fashioned aging process. Additionally, it has been found that, upon cooking a piece of meat treated in accordance with the present invention, the fat content that has been injected into the meat by the stitch pumping method tends to gradually separate out from the meat as it is cooked. Accordingly, we have obtained all the advantages inherent in marbled meat for cooking and flavoring purposes and yet have, in the end product, removed a great deal of this fat. This result is obtained since even through the meat is marbleized and looks identical to prime beef, the artificial marbling does not follow the natural grain of the meat and therefore separates therefrom more readily than does the natural marbling of the prime beef which does follow the natural grain and is embedded therein. This becomes important, particularly in modern times, since so many people are required to follow a more or less strict diet. Additionally, it is known that cholesterol is now considered to be one of the factors contributing to heart conditions. Accordingly, the present invention now makes available lean type beef which has not been raised to a large fat content and yet supplies all of the advantages of fat content in the lean beef by adding only a small amount of fat evenly dispersed for cooking and flavor purposes together with the tenderization necessary to make the meat palatable.

Economically, this process drastically cuts the costs in portion control meats as much as 75% and, accordingly, will not change the wholesale price structure even though it produces the above discussed advantages.

Another aspect of the final product is the practical one of the actual appearance of the meat. One of the major problems in tenderized meats has been educating the consumer to accept these meats as comparable in flavor, taste and food value to freshly cut meat. A primary obstacle to this consumer education has been the appearance of the meat which, from a practical standpoint, is the only way a consumer has of judging quality of meat before it has been cooked and actually eaten. When meat is treated as set forth in the present invention, it has the appearance of a choice or prime piece of meat, thus making it highly marketable at a price much cheaper than the more expensive cuts of meat. The consumer will be able to purchase meat that looks and tastes like choice or prime meat, thus enabling more people to purchase more meat.

The process of the present invention will produce a dietetic type meat, having all the qualities of choice and prime before cooking, and having the fat content removed through cooking, leaving only the choice and prime effect in over-all tenderness, moisturization and flavor. Since the marbleization of fat has been injected, and not grown into the tissue of the meat under cooking temperatures, the fat will melt away from the meat, leaving only the flavor and the meat will revert back to its original low fat content. Therefore, this meat is high in protein and low in cholesterol.

While this invention has been described in connection with specific steps and compositions, it should be understood that various modifications thereof will occur to those skilled in the art without departing from the spirit and scope of the invention as set forth in the appended claims.

We claim:

1. In a process for enhancing the palatability of meats the step of stitch pumping chilled meat with a liquid solution containing liquefied fat and a proteolytic enzyme tenderizer.

2. In a process for treating meat to enhance the palatability thereof, the step of stitch pumping chilled meat with a liquefied medium containing approximately equal parts of purified fat and a solution containing a proteolytic enzyme tenderizer.

3. In a process for treating meat to improve the palatability thereof, the step of stitch pumping chilled meat with a liquid medium containing rendered fat and a proteolytic enzyme tenderizer.

4. A process for treating meat to improve the palatability thereof which comprises chilling said meat, heating a composition consisting essentially of approximately 50% by weight of water containing a proteolytic enzyme and flavoring and approximately 50% by weight of fat to a temperature sufficient to liquefy said composition, and stitch pumping said chilled meat with said heated composition.

5. The process of claim 4 wherein said composition is heated to a temperature of approximately 110° F.

6. The process of claim 1 wherein said liquefied fat is a vegetable fat.

7. The process of claim 4 wherein said fat is a vegetable fat.

References Cited by the Examiner

UNITED STATES PATENTS

| 2,418,914 | 4/47 | Tichy | 99—107 |
| 2,516,923 | 8/50 | Schotte | 99—107 |
| 2,767,096 | 10/56 | Schotte | 99—107 |
| 2,805,163 | 9/57 | Williams et al. | 99—107 |
| 2,961,321 | 11/60 | Williams | 99—107 |

A. LOUIS MONACELL, *Primary Examiner.*

HYMAN LORD, ABRAHAM H. WINKELSTEIN,
*Examiners.*